United States Patent [19]

Cheradame et al.

[11] 4,125,692

[45] Nov. 14, 1978

[54] PROCESS FOR PRODUCING A MACROMOLECULAR COMPOUND HAVING A FUNCTIONAL GROUP AT EACH END OF THE MOLECULE

[75] Inventors: Hervé M. Cheradame, La Tronche; Jacques H. Garapon, Eybens; Christian G. Guizard, Saint-Martin d'Heres; Maryvonne Brigodiot, Grenoble, all of France

[73] Assignee: Etat Francais represented by the "Delegue General pour l'Armement", France

[21] Appl. No.: 796,593

[22] Filed: May 13, 1977

[30] Foreign Application Priority Data

May 31, 1976 [FR] France .................................. 76 16290

[51] Int. Cl.$^2$ ............................ C08F 8/50; C08F 8/42
[52] U.S. Cl. ...................................... 526/48.3; 526/42; 526/44; 526/46; 526/47.4; 526/914

[58] Field of Search ................ 526/48.3, 46, 44, 47.4, 526/42; 528/914

[56] References Cited

U.S. PATENT DOCUMENTS

| 3,257,346 | 6/1966 | Gruver et al. ...................... 526/48.3 |
| 3,313,793 | 4/1967 | De La Mare et al. ............... 528/914 |

*Primary Examiner*—William F. Hamrock
*Attorney, Agent, or Firm*—Stevens, Davis, Miller & Mosher

[57] ABSTRACT

Di or polyfunctional macromolecular compounds having a terminal functional group at each end of the molecule are produced by selectively cleaving the carbon-carbon double bonds of an unsaturated polymer by the oxidizing action of a ruthenium tetroxide oxidizing system. The compounds are useful as components in crosslinked plastics materials, in binders for rocket fuels, and as components in tri or polysequential copolymers.

13 Claims, No Drawings

PROCESS FOR PRODUCING A MACROMOLECULAR COMPOUND HAVING A FUNCTIONAL GROUP AT EACH END OF THE MOLECULE

BACKGROUND OF THE INVENTION

This invention relates to a process for producing a macromolecular compound having a functional group at each end of the molecule. For convenience, such macromolecular compounds are termed $\alpha,\omega$-compounds. They are by definition at least difunctional compounds; when the molecule has more than two ends bearing terminal functional groups it is said to be $\alpha,\omega$-polyfunctional.

According to the prior art, $\alpha,\omega$-polyfunctional macromolecular compounds, also known as functionalised oligomers, are conventionally obtained by two methods, namely direct synthesis and the degradation of high molecular weight macromolecules.

The direct synthesis by polymerisation of oligomers having terminals functional groups has hitherto been extremely difficult to perform, if not impossible. This is because it is only possible when the monomer used polymerises anionically if the initiator is bifunctional. Further, the costs involved in this method of synthesis preclude its application on a commercial scale. Synthesis is difficult if the monomer polymerises radically or cationically.

Hitherto, the degradation of high molecular weight macromolecules has been carried out by the oxidising cleavage of unsaturated macromolecules. In the most commonly used process, ozone is used to attack carbon-carbon double bonds in the macromolecule. However this process is attended by the disadvantage that it is not sufficiently selective and permits the oxidation of sites of the macromolecule other than the double bonds, particularly since in practice the ozone is mixed with oxygen, which can give rise to per-oxidation reactions. In order to try to prevent these extraneous reactions, additives may be introduced which act as inhibitors. Unfortunately, either the additives are consumed, which further increases the cost of the operation, or their effectiveness is inadequate.

$\alpha,\omega$-Polyfunctional macromolecules, i.e. macromolecules containing reactive terminal functions, are highly sought-after products. This is particularly the case with $\alpha,\omega$-difunctional macromolecules which have numerous uses. For example starting from $\alpha,\omega$-difunctionalised polymers or oligomers, it is possible by using polyfunctional crosslinking agents to form three-dimensional macromolecular networks having particularly desirable physico-mechanical properties. In particular, if the molecular weight distribution of the oligomers is fairly narrow, then the distribution of the inter-node intervals of the network is also fairly narrow i.e. the network is fairly tight. It is known that crosslinked products such as these can be expected to have further improved mechanical properties.

Certain $\alpha,\omega$-difunctionalised products are also suitable for use in binders for rocket fuels. Liquid elastomers having a glass transition temperature which is as low as possible are primarily required for this particular application.

The production of trisequential or polysequential copolymers is also a field in which $\alpha,\omega$-difunctionalised oligomers are extremely useful. A disadvantage however is that although polysequential copolymers can be directly synthesised, for example by anionic polymerisation, this process is difficult to carry out on an industrial scale and cannot be used with monomers which, like isobutene, only polymerise cationically. In contrast, trisequential or polysequential copolymers may be obtained from $\alpha,\omega$-difunctional oligomers by the reactions commonly encountered in organic chemistry. For example, it is possible to react $\alpha,\omega$-glycol oligomers with $\alpha,\omega$-acid dichloride oligomers or even to react $\alpha,\omega$-diol oligomers with $\alpha,\omega$-diisocyanate oligomers. A sequential polycondensate is obtained in this way. It is also possible to initiate the polymerisation of a monomer from both ends of a suitably difunctionalised oligomer. In this case, a trisequential copolymer is obtained. Irrespective of the method used to synthesise these sequential copolymers, it can be seen that the starting materials are $\alpha,\omega$-di-functionalised oligomers. It is known that these sequential copolymers show the phenomenon of phase segregation which provides them with interesting physicomechanical properties. In particular, if a trisequential copolymer has a central elastomeric sequence and two terminal plastomeric sequences, or if a sequential copolycondensate has alternate elastomeric and plastomeric sequences, the material obtained will show so-called "thermoplastic elastomer" properties, for which these products are in demand.

OBJECT OF THE INVENTION

It is an object of this invention to provide a process wherein macromolecular compounds having a terminal group at each end of the molecule are produced by the selective oxidative cleavage of the carbon-carbon double bonds of an unsaturated polymer. The cleaving reagent used in such that other carbon-carbon bonds in the polymer chain are not oxidised during the cleavage.

SUMMARY OF THE INVENTION

The invention provides a process for producing a macromolecular compound including molecules having a functional group at each eand of the molecule, which process comprises carrying out an oxidising reaction on the carbon-carbon double bonds of an unsaturated polymer with an oxidising system comprising ruthenium tetroxide, to form the desired compound.

The principle on which the invention is based consists in utilising the oxidising properties known per se of ruthenium tetroxide for cleaving all the carbon-carbon double bonds contained in the polymeric starting material to form macromolecules having an oxidised function, essentially a ketone or acid function, at each end of the molecule.

Preferably the process is carried out at a temperature of from 0° to 50° C.

The polymer used as starting material in accordance with the invention must contain carbon-carbon double bonds. If all these double bonds are situated in the main chain of the polymer, difunctional macromolecular compounds will be obtained. If, by contrast, these are double bonds both in the main chain and in a side chain, then polyfunctional macromolecular compounds will result.

Since the function of the ruthenium tetroxide is to cleave the molecules of the unsaturated polymer at each position where the polymer contains a carbon-carbon double bond, the end product obtained will be a macromolecular compound having a molecular weight which is lower than that of the starting polymer. The molecular weight, which reflects the chain length of the compound, produced, may of course be regulated by using as starting material an unsaturated polymer containing carbon-carbon double bonds which are more or less widely separated. It is particularly desirable to produce macromolecular compounds with relatively high molecular weights. For this reason polymers with a relatively low degree of unsaturation are preferably used as starting materials. The degree of unsaturation of the starting material may vary within wide limits. It may be low, for example from 0.1 to 0.5%, if it is desired to obtain macromolecular compounds of high molecular weight, or may for example be from 10 to 30% in cases where it is desired to obtain compounds of relatively low molecular weight.

The unsaturated polymers which may be used as starting materials may be homo-polymers or copolymers. As homopolymers there may be used for example partially hydrogenated conjugated dienes. Examples of copolymers which may be used are copolymers of monoolefins and conjugated dienes, for example, copolymers of isobutylene with isoprene, butadiene, piperylene, 1,3-hexadiene, 2,4-hexadiene or 2,3-dimethyl butadiene. There may also be used chlorinated or fluorinated homopolymers or copolymers which contain residual carbon-carbon double bonds in their polymer chain, for example polyvinyl chloride or chlorinated butyl rubber.

Ideally the process according to the invention is carried out in a solvent, for example an organic chemical product which is capable of dissolving considerable quantities of the unsaturated polymer, which solvent is inert to the reactants and products, particularly the ruthenium tetroxide, under the conditions of the reaction. Preferred solvents are saturated hydrocarbons such as pentane, hexane or heptane or mixtures thereof. However other solvents such as methylene chloride or carbon tetrachloride may be used instead. The concentration of the unsaturated polymer in the solvent used is preferably from 1 to 10%, whilst the concentration of ruthenium tetroxide in the reaction medium is preferably of the order of 0.01 to 5%.

According to a preferred embodiment of the invention, the reaction mixture includes ruthenium dioxide and a co-oxidising agent to oxidise the ruthenium dioxide to ruthenium tetroxide in situ. As the ruthenium tetroxide is reduced to dioxide by reaction with the carbon-carbon double bonds, so this dioxide is oxidised by the co-oxidising agent to form further ruthenium tetroxide. In one form of this embodiment the process is carried out by adding the co-oxidising agent to the reaction mixture as the reaction progresses. Alternatively the process may be carried out by forming a mixture of the co-oxidising agent and ruthenium dioxide, for example in aqueous solution, and then progressively adding to the mixture a solution of the unsaturated polymer in an inert solvent.

Co-oxidising agents which may be used are, for example, hypochlorites, cerium (IV) salts which may be subsequently regenerated by, for example, electrolytic oxidation, periodic acid or a permanganate in the presence of a tertiary amine, peracids which have a redox potential which enables the ruthenium dioxide to be converted into ruthenium tetroxide, or derivatives of chromium (VI) in acid medium.

It is preferred for the oxidising system to include as co-oxidising agent an organic peracid, for example performic acid, peracetic acid or diperadipic acid. It is particularly preferred to use peracetic acid both for technical and for economic reasons. Peracetic acid, which may optionally be stabilised, has a very high oxidising power enabling the ruthenium dioxide to be reoxidised very rapidly, and a cost price which is compatible with the production of functionalised oligomers in large quantities.

With regard to the co-oxidising agent it is not necessary that it must be readily soluble in the reaction medium. The oxidation of the ruthenium dioxide may be the consequence either of a reaction at the interface between the two phases (where the co-oxidising agent is insoluble), or of a liquid phase reaction between the dioxide and a low concentration of co-oxidising agent which is renewed as it is consumed. The use of an insoluble co-oxidising agent may even be considered as an advantage since it ensures the almost complete absence of any extraneous reactions such as, for example, epoxidation.

It is preferable for the reaction medium to contain a small proportion of a strong acid, such as trifluoroacetic acid. The function of this strong acid is to convert any epoxide functional groups which may be formed by an extraneous reaction of the co-oxidising agent with the unsaturated polymer into diol functional groups which may be subsequently be cleaved by the ruthenium tetroxide present. It is also possible to use nitric acid as strong acid; this may also serve as solvent for the organic peracid when this compound is used as co-oxidising agent.

The process according to the invention is preferably carried out by adding a solution of the unsaturated polymer dropwise to a solution of ruthenium tetroxide. The addition of the polymer solution is accompanied by addition of the co-oxidising agent or a solution thereof. The addition of the polymer solution causes the reaction medium to turn brown, a colour which is maintained until the end of the reaction, which is reflected in the appearance of a yellow colour caused by the conversion of all the ruthenium into tetroxide form.

The progress of the process may be monitored by determining the functional groups obtained by oxidation, or by measuring the molecular weights of the reaction components.

In the case where isoprene-butyl rubber (isobutene/isoprene copolymer) is used as starting material, each molecule of the compound produced should contain a ketone function and a carboxylic acid function. In a test, determination of the ketone functions by forming the corresponding phenyl hydrazones showed that allowing for experimental errors, cleavage was almost complete. It was also possible to show that the average molecular weight of the macromolecular compound produced was equal to the theoretical average which may be calculated from a knowledge of the degree of unsaturation of the starting copolymer. The functionality was therefore equal to 2, allowing for experimental errors.

The following Examples illustrate the invention.

EXAMPLE 1

Cleavage of a 2% unsaturated butyl rubber using ruthenium tetroxide/peracetic acid:

In a first stage the reaction medium was prepared by dispersing ruthenium dioxide (20 mg) in pure hexane (50 ml) with vigorous stirring. Thereafter all the ruthenium dioxide present was oxidised to tetroxide form by adding the necessary quantity of peracetic acid (1.5 N solution of peracetic acid in carbon tetrachloride).

A solution of 2% unsaturated butyl rubber having an average viscosimetric molecular weight of 350,000 (10 g of polymer in 150 ml of hexane) was then added dropwise to the reaction medium at ambient temperature over a period of about 1 hour. A corresponding amount of peracetic acid was also added as the reaction progressed, an important aspect of this procedure being the fact that throughout the reaction most of the ruthenium was present in its tetroxide form, in which form it was available to react with the double bonds of the polymer.

On completion of the reaction the oligomers recovered after elimination of the ruthenium oxide were found to have a mean numerical average molecular weight of 3090 (by vapour pressure osmometry). The theoretical molecular weight was calculated to be 2800.

EXAMPLE 2

Cleavage of a 2% unsaturated butyl rubber using ruthenium tetroxide/diperadipic acid:

In a first stage, 16 mg of ruthenium dioxide, 2 g of diperadipic acid in 25 cc of concentrated nitric acid and 50 cc of hexane were stirred together in a 250 cc capacity reactor. Thereafter the polymer (5 g in 75 cc of hexane) was added dropwise to this reaction medium over a period of about 1 hour, together with another 2 g of diperadipic acid in solution in acetic acid.

During the addition, the colour of the reaction mixture varied between straw yellow and brown-yellow. Any blackening of the solution indicated that the introduction of the polymer was too rapid, not allowing sufficient time for the reoxidation of the dioxide into ruthenium tetroxide to take place. On completion of the addition, the reaction mixture was stirred for 3 hours before the cleaved polymer was separated therefrom.

The measured average numerical molecular weight (vapour pressure osmometry) of the oligomers obtained was 2940. The calculated value based on the degree of unsaturation of the starting polymer was 2800.

EXAMPLE 3

Cleavage of a 0.85% unsaturated butyl rubber using ruthenium tetroxide/diperadipic acid:

The procedure was the same as in Example 2. A mixture of 16 mg of $RuO_2$, 2 g of diperadipic acid, 25 ml of concentrated nitric acid and 50 ml of hexane was stirred in a 250 ml capacity reactor. Thereafter the polymer solution (5 g in 75 ml of hexane) was added dropwise to the reaction mixture over a period of about 1 hour, with 1 g of diperadipic acid in solution in acetic acid being optionally reintroduced if the rate of reoxidation of the ruthenium dioxide was too low. On completion of the addition, the reaction mixture was stirred for 3 hours before the cleaved polymer was extracted therefrom.

The average numerical molecular weight of the oligomers obtained was 6900, the average numerical weight calculated from the degree of unsaturation of the polymer being 6600.

EXAMPLE 4

Cleavage of a 1.25% unsaturated piperylene (1,3-pentadiene)butyl rubber using ruthenium tetroxide/peracetic acid:

The reaction medium was prepared by dispersing ruthenium dioxide (20 mg) in pure hexane (50 ml) with vigorous stirring. Then in a first reaction, all the ruthenium dioxide present was oxidised into tetroxide form by adding the necessary quantity of peracetic acid (1.5 N peracetic acid solution in carbon tetrachloride). The solution of rubber (10 g of polymer in 150 ml of hexane) was then added dropwise over a period of about 1 hour at ambient temperature, further peracetic acid being added as the reaction progressed. The oligomers recovered from the reaction mixture after elimination of the ruthenium oxide had an average numerical molecular weight of 4900 (as determined by vapour pressure osmometry). The theoretical molecular weight was 4550.

EXAMPLE 5

Cleavage of a 3.7% unsaturated piperylene-butyl rubber using ruthenium tetroxide/peracetic acid:

Using the procedure of Example 4, but a polymer with a different degree of unsaturation, an oligomer was recovered after elimination of the ruthenium oxide which had an average numerical molecular weight of 1900 (as determined by vapour pressure osmometry). The theoretical molecular weight was 1600.

EXAMPLE 6

Cleavage of a 2.5% unsaturated piperylene-butyl rubber using ruthenium tetroxide/peracetic acid:

The procedure was the same as in Example 4. The oligomers recovered after elimination of the ruthenium oxide had an average numerical molecular weight of 2260 (as determined by vapour pressure osmometry). The theoretical molecular weight was 2250.

EXAMPLE 7

Cleavage of a 3.10% unsaturated 2,3-dimethyl butadiene-butyl rubber using ruthenium tetroxide/peracetic acid:

The reaction medium was prepared by dispersing ruthenium dioxide (20 mg) in pure hexane (50 ml) with vigorous stirring. In a first reaction stage, all the ruthenium dioxide present was oxidised into tetroxide form by adding the necessary quantity of peracetic acid (1.5 N peracetic acid solution in carbon tetrachloride). Thereafter rubber solution (10 g of polymer in 150 ml of hexane) was added dropwise over a period of about 1 hour at ambient temperature. Further peracetic acid was also added as the reaction progressed. The oligomers recovered after elimination of the ruthenium oxide had an average numerical molecular weight of 1800 (as determined by vapour pressure osmometry).

EXAMPLE 8

Cleavage of a 2.5% unsaturated 2,3-dimethyl butadiene-butyl rubber using ruthenium tetroxide/acetic acid:

Using the procedure of Example 7, oligomers were recovered after elimination of the ruthenium oxide which had an average numerical molecular weight of 2400 (as determined by vapour pressure osmometry). The theoretical molecular weight was 2400.

In all these Examples, the presence of a small quantity of strong acid in the reaction medium promoted total cleavage.

EXAMPLE 9

Application of the process to copolymers of isobutene with piperylene and with 2,3-dimethyl butadiene:

The oxidation technique as described above for butyl rubber was applied to copolymers of isobutene with piperylene and 2,3-dimethyl butadiene prepared in the laboratory.

The desired oligomers were obtained by oxidation catalysed by ruthenium tetroxide regenerated with peracetic acid.

Comparison of the theoretical average numerical molecular weights calculated from the degree of unsaturation of the starting copolymers with the measured molecular weights obtained after cleavage showed that the piperylene and the 2,3-dimethyl butadiene were primarily incorporated in the 1,4-positions of the isobutene.

The average numerical molecular weights were measured by tonometry. The theoretical molecular weight were obtained by determining the double bonds in the starting copolymer with pyridinium perbromide. The functional groups were determined by microanalysis.

The production and oxidation of the two copolymers mentioned above enabled a range of oligomers with different molecular weights and with various reactive functional groups at the ends of the chain to be obtained.

Examples of the reactions by which functional group-bearing oligomers of isobutene may be obtained are as follows:

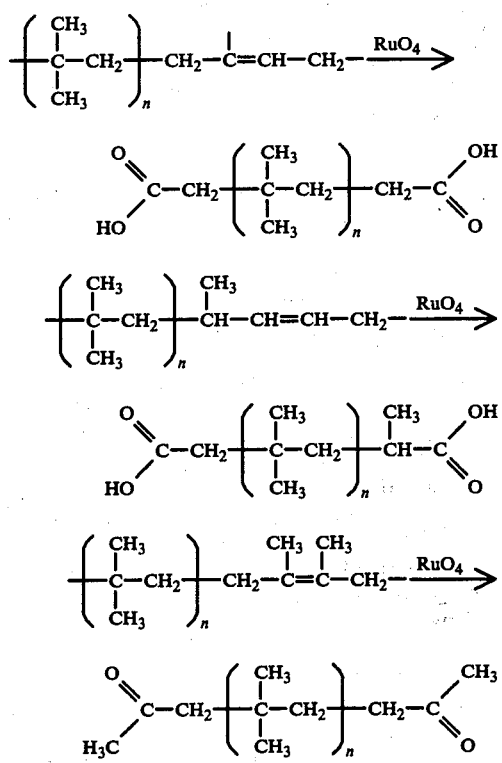

EXAMPLE 10

10 g of 2.1% unsaturated butyl rubber were dissolved in 200 ml of carbon tetrachloride. To this solution was added a small quantity of ruthenium dioxide (approximately 0.2% by weight, based on the polymer) in the form of a small quantity of hydrated dispersion. Peracetic acid was then progressively introduced over a period of about 30 minutes with vigorous stirring, in a quantity equivalent to 4 times the theoretically necessary amount. The oligomers which formed were recovered after the reaction medium had been stirred for a further 3 hours. After elimination of the ruthenium dioxide, the cleaved polymer was found to have an average numerical molecular weight of 6700, as opposed to the theoretically expected value of 2600.

The poor result may be attributed to the fact that the uncleaved polymer, present in too high a concentration, was contacted with peracetic acid and epoxidised under its effect, this procedure producing a deficit of ruthenium tetroxide relative to the degree of unsaturation. Proof of this is supplied by the fact that treatment of these oligomers with metaperiodic acid gave products having a molecular weight of 2600, exactly corresponding to the expected value.

In order to compare the previously mentioned ozone process with the ruthenium tetroxide process according to the invention, a prolonged oxidation test was carried out in the presence of ruthenium tetroxide. During the test, which was carried out on model olefin, it was impossible to detect any oxidation of the carbon-carbon single bonds by the ruthenium tetroxide.

In a comparison of the degradation of butyl rubber as a function of time by ozone and by ruthenium, it was found that the ozone not only cleaved the carbon-carbon double bonds, but it also attacked the single bonds in a second stage. Reaction times of the order of 4 hours were sufficient to obtain complete degradation of the starting polymer. At the same time, lateral peroxidation of the chains produced an increase in the number of functional groups, making the functionality of the molecule considerably greater than 2.

Reactions carried out with ruthenium tetroxide indicated that the degradation process did not go beyond the carbon-carbon double bonds. In order to verify this, the change in molecular weight of isoprene-butyl rubber subjected to oxidation by ruthenium tetroxide over a period of 24 hours was monitored by gel permeation chromatography. It was found that the two double bonds (on a molar basis) were completely cleaved during the first 30 minutes of the reaction. There was no further change in the molecular weight of the sample over a period of several hours. The chromatograms of two samples taken after an interval of 23 hours 30 minutes showed that there was very little further displacement towards low molecular weights.

The selective oxidation of carbon-carbon double bonds by tetroxide therefore represents an important advantage of this oxidising agent over ozone.

We claim:

1. A process for making a macromolecular compound having at least two terminal groups, each of which is independently selected from the group consisting of carbonylic and carboxylic acid groups, said macromolecular compound being produced from a polymer containing at least 2 carbon-carbon double bonds, said polymer being capable of being cleaved at each of said carbon-carbon double bonds and being selected from the group consisting of a partially hydrogenated homopolymer of conjugated diene, a copolymer of a monoolefin and a conjugated diene, and a chlorinated or fluorinated homopolymer or copolymer which contains residual carbon-carbon double bonds on the polymer chain which comprises:

contacting in solution said polymer with ruthenium tetroxide in the presence of ruthenium dioxide and a co-oxidizing agent capable of oxidizing in situ ruthenium dioxide to ruthenium tetroxide.

2. A process for making a macromolecular compound having at least two terminal groups, each of which is independently selected from the group consisting of carbonylic and carboxylic acid groups, said macromolecular compound being produced from a polymer containing at least 2 carbon-carbon double bonds, said polymer being capable of being cleaved at each of said carbon-carbon double bonds and being selected from the group consisting of unsaturated butyl rubber, unsaturated piperylene-butyl rubber, 2,3-dimethyl butadiene-butyl rubber and chlorinated butyl rubber which comprises:

contacting in said solution said polymer with ruthenium tetroxide in the presence of ruthenium dioxide and a co-oxidizing agent capable of oxidizing in situ ruthenium dioxide to ruthenium tetroxide.

3. A process of claim 2 wherein said polymer is unsaturated butyl rubber.

4. A process of claim 2 wherein said polymer unsaturated piperylene-butyl rubber.

5. A process of claim 2 wherein said polymer is unsaturated 2,3-dimethyl butadiene-butyl rubber.

6. A process as in claim 2 wherein said polymer is chlorinated butyl rubber.

7. A process of claim 1 wherein said co-oxidizing agent is a hypochlorite.

8. A process as in claim 1 wherein said co-oxidising agent comprises a peracid.

9. A process as in claim 8 wherein the peracid is selected from the group consisting of peracetic acid, peradipic acid and performic acid.

10. A process as in claim 1 wherein the reaction is carried out in the presence of a strong acid.

11. A process as in claim 10 wherein the strong acid is trifluoroacetic acid.

12. A process as in claim 10 wherein the strong acid is nitric acid.

13. A process as in claim 1 wherein the reaction is carried out at a temperature of from 0° to 50° C.

* * * * *